United States Patent [19]
Kirchner et al.

[11] 4,084,213
[45] Apr. 11, 1978

[54] PORTABLE KEYBOARD/DISPLAY TERMINAL

[75] Inventors: Richard K. Kirchner, Bloomington; Nicholas Cleanthis Andreadakis; William Norman Mayer, both of White Bear Lake, Minn.

[73] Assignee: Modern Controls, Inc., Minneapolis, Minn.

[21] Appl. No.: 770,800

[22] Filed: Feb. 22, 1977

[51] Int. Cl.² ............................................. H02B 1/00
[52] U.S. Cl. .................................. 361/384; 174/16 R
[58] Field of Search ............... 361/381, 383, 384, 391; 174/50, 16 R

[56] References Cited
U.S. PATENT DOCUMENTS

| | | | |
|---|---|---|---|
| 2,897,487 | 7/1959 | Owen | 174/16 R |
| 3,371,975 | 3/1968 | Meltzer | 361/384 X |
| 3,790,859 | 2/1974 | Schraeder et al. | 361/384 |
| 3,962,608 | 6/1976 | Forster et al. | 361/384 |
| 3,967,874 | 7/1976 | Calabro | 361/384 X |

Primary Examiner—J D Miller
Assistant Examiner—Peter S. Wong

[57] ABSTRACT

Apparatus for housing the electronic components, keyboard and display screen for a portable communications terminal wherein the terminal is completely self-contained, and the apparatus may be closed into a case for carrying and opened into a plurality of operable positions, having power and heat dissipation features for safe operation in any of these positions. The heat dissipation system includes air circulation channels for conveying air flow over all internal components from a single source of air.

10 Claims, 6 Drawing Figures

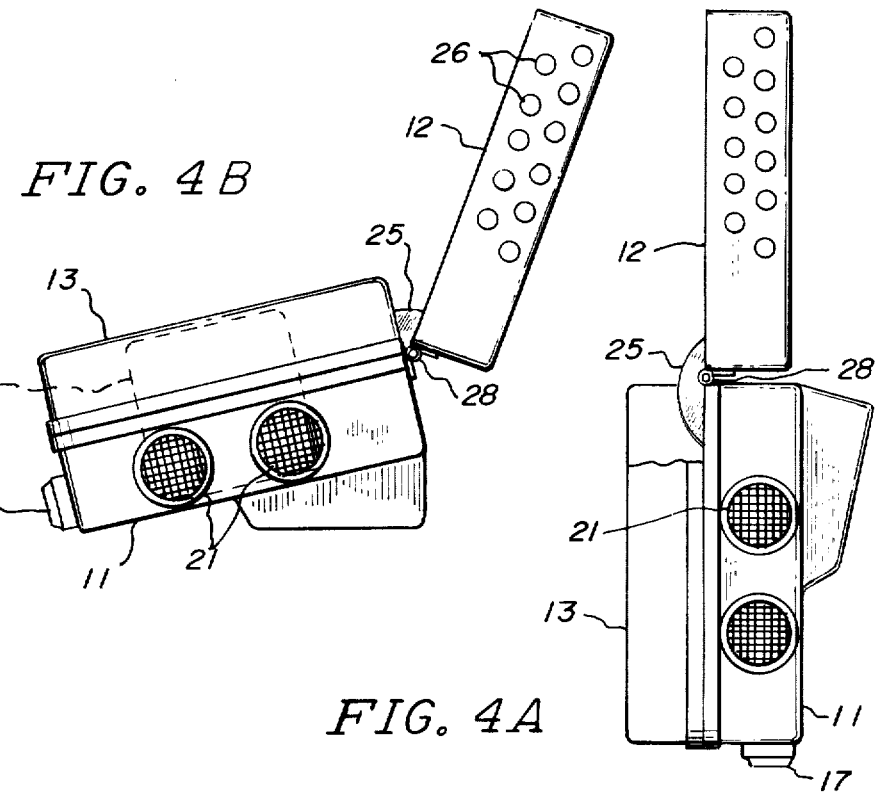
FIG. 4B
FIG. 4A
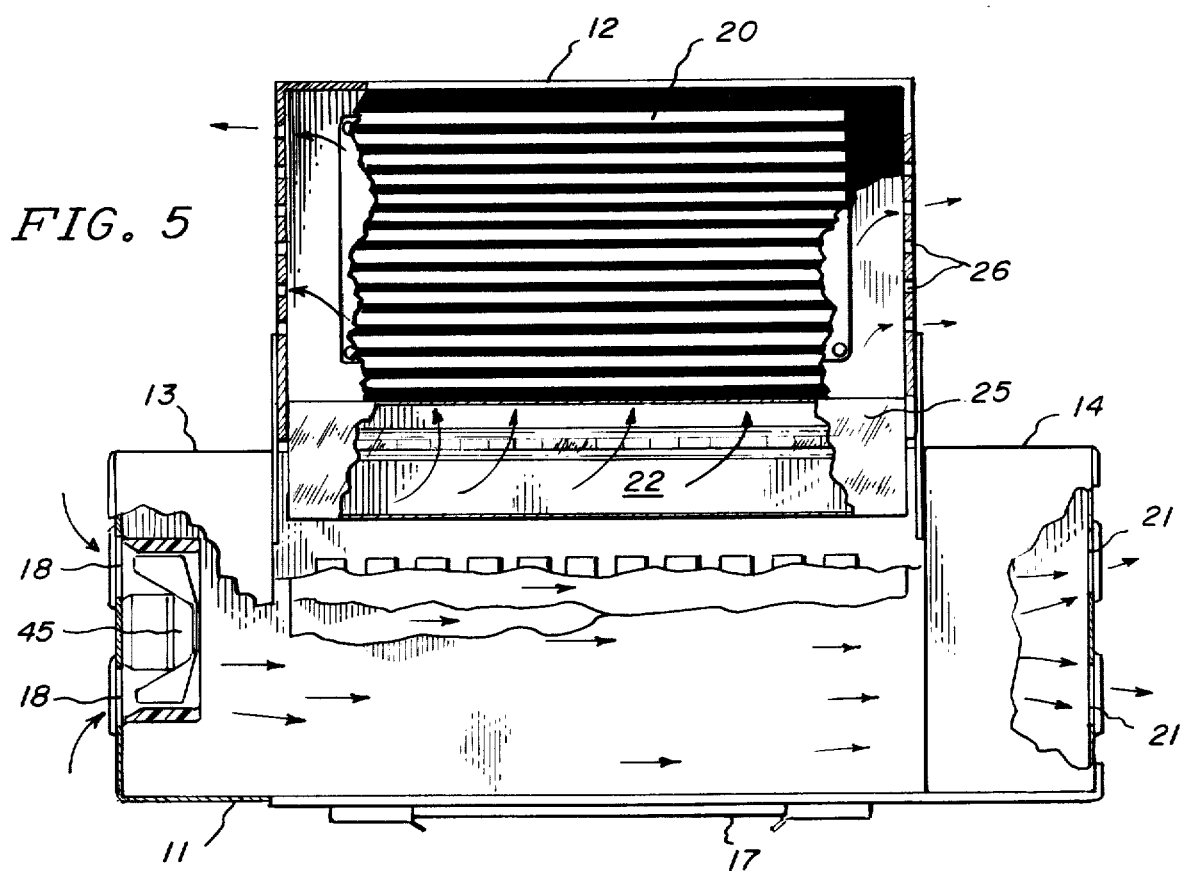
FIG. 5

PORTABLE KEYBOARD/DISPLAY TERMINAL

BACKGROUND OF THE INVENTION

The present invention relates to a portable communications terminal, and particularly to a novel cabinet design for housing the electronic components, including a keyboard and display screen, for providing a self-contained and portable terminal package.

Modern computer technology has made it possible for digital computer systems to be electronically coupled to communications devices at remote locations by interconnecting through telephone lines. Acoustic coupler devices are well known in the art for attachment to the common telephone receiver to enable the telephone receiver to become an element in this communications link. In a computer processing center a number of telephone receivers may be coupled in this manner into a digital computer processing system and the computer may therefore communicate with other computers or communication devices anywhere in the world where there is a connectable telephone receiver. At these remote locations an operator may use a similar acoustic coupling device in conjunction with an electronic keyboard to transmit data into the computer, or in conjunction with an output device such as a display screen or printer to receive information from the computer. Salesmen, for example, may place orders directly into a central computer inventory system and may receive information back concerning available supplies and customer information from such a system.

It is desirable to provide such remote communications terminals with an alphanumeric keyboard for inputting data to the computer system and a display screen for receiving data from the computer system, and to incorporate these devices into a unit which is truly portable. While technological advances have consistently reduced the size requirements for such terminals, they continue to be heavy and bulky and difficult to transport. In addition, such terminals are frequently subject to misalignment and damage due to mechanical shock and must therefore be carefully handled.

SUMMARY OF THE INVENTION

The present invention includes a portable keyboard/display terminal contained in a small case for carrying, and which may be opened for immediate operation, wherein the cover which is opened houses a visual display screen and the remaining portion of the case houses the keyboard and electrical components necessary for the operation of the apparatus. Means is provided for plugging the apparatus into a source of 110-volt AC power, and for connecting the apparatus to a coupling device for transmitting data over telephone lines. The electronic circuit components are mounted on printed circuit boards which are spaced apart to form intermediate air channels for directing cooling air throughout the apparatus. A single fan provides circulating air, and the air channels direct this air over components on the circuit boards regardless of the operating position of the cover relative to the rest of the cabinet.

BRIEF DESCRIPTION OF THE DRAWINGS

A preferred embodiment of the invention is disclosed herein, and with reference to the appended drawings, in which:

FIG. 4A is a side cross-section of the apparatus in its fully open position; and FIG. 4B is a side view of the apparatus in a partially open position; and FIG. 5 is a top view of the apparatus illustrating the air flow paths.

DESCRIPTION OF THE PREFERRED EMBODIMENT

Figure 1:
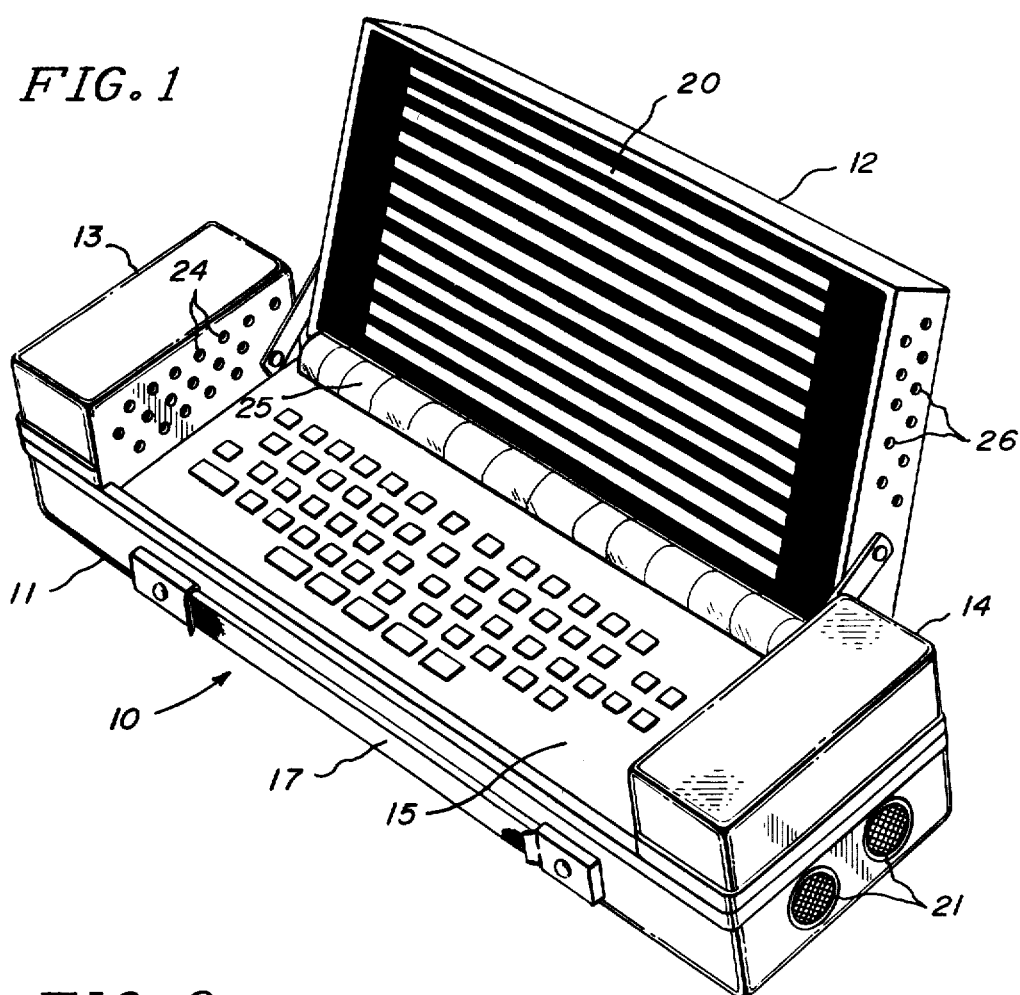
FIG. 1 illustrates the apparatus in isometric view in one of its open positions.

Referring first to FIG. 1, an isometric view is shown of the apparatus in a partially open position. The carrying case 10, which houses the entire keyboard/display terminal apparatus, measures approximately 16 inches wide by 6 inches deep by 4 inches high. A keyboard 15 is recessed into the base portion 11 of the carrying case 10, and a display screen 20 is recessed into the cover 12, which is hinged to open from the base portion. Two small covers 13 and 14 are removable for access to the components which they enclose. Cover 13 encloses a fan, preferably of the "muffin" type such as Model SU2A3, manufactured by Rotron Inc., Woodstock, N.Y. Cover 14 encloses a power transformer and electronic components for transforming the 110-volt AC input voltage to DC voltage of a suitable current level for operating the apparatus. A carrying handle 17 is provided along the edge of carrying case 10 so that the entire apparatus may be transported. Screens 21 cover openings to permit air flow through the apparatus, and similar screens (not shown) are provided at the other end of the carrying case 10. A plurality of holes 24 are located on the inside vertical surface of cover 13 for air flow purposes as will be hereinafter described. Similarly, a plurality of holes (not shown) are located on the inside vertical surface of cover 14. Likewise, a plurality of holes 26 are located along the vertical edge of cover 12, and a similar plurality of holes are located along the opposite vertical edge of cover 12. A flexible membrane 25 extends between the keyboard and display screen, one side being attached to the keyboard surface and the other side being attached to the display screen surface. The function of this flexible membrane is extremely important in directing air flow throughout the apparatus, and will be described in more detail hereinafter.

Figure 2:
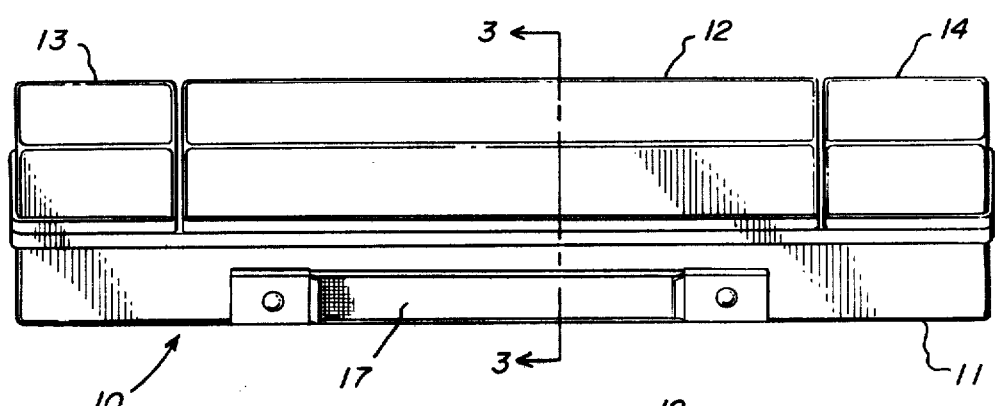
FIG. 2 is a front view of the apparatus in a closed position.

FIG. 2 shows the apparatus in front view with the cover 12 closed. In this position, the apparatus is ready for transporting by handle 17. The respective holes in the vertical edge surfaces of covers 12, 13 and 14 are in flow communication whenever cover 12 is closed as shown, and it is possible for air flow to pass through the respective covers to adjacent covers and the volume enclosed by said covers.

Figure 3:
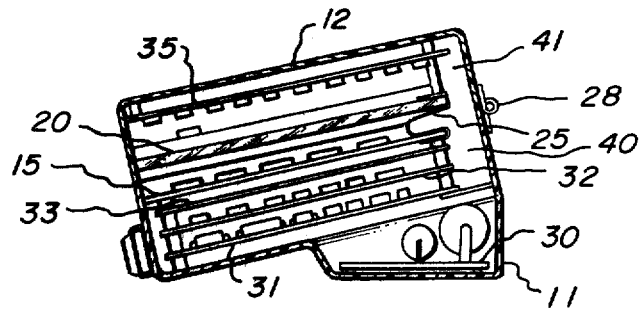
FIG. 3 is a cross-sectional view taken along the lines 3—3 of FIG. 2.

FIG. 3 shows a side cross-sectional view taken along the lines 3—3 of FIG. 2. A circuit board 30 is positioned in the lower recess of base 11, and it contains a plurality of electrical components necessary for the operation of the terminal. Circuit boards 31, 32, and 33 are stacked in spaced apart relation throughout the base 11 so as to provide an air flow channel between respective circuit boards. Each of these circuit boards contains a plurality of electronic components necessary for the operation of the terminal, and a top circuit board retains the mechanical switches which form keyboard 15. Circuit board 35 is positioned in cover 12 behind display screen 20. Circuit board 35 contains the electronic components necessary for the operation of display screen 20. An air passage 40 is provided adjacent the rear edges of circuit boards 31-33, for providing a means for air flow to move upwardly toward cover 12. An air passage 41 is provided along the rear edge of display screen 20 for similar air communications purposes. Hinge 28 is preferably an elongated piano hinge which provides a measure of air sealing isolation between cover 12 and the base portion 11 regardless of the relative positions of cover 12.

The preferred path for air flow across the circuit boards of FIG. 3 is in a direction along the length of case 10. Therefore, in FIG. 3 the air flow direction is primarily outward from the paper, although air passages 40 and 41 permit a portion of the air to flow upwardly into cover 12, and particularly between circuit board 35 and display screen 20. The perforations previously described along the edge of cover 12 permit such air flow to escape from cover 12 and thereby provide a means for cooling the heat generating circuits within cover 12.

FIG. 4A illustrates the terminal in its fully opened position, wherein keyboard 15 is parallel with display screen 20. In this position flexible membrane 25 remains slightly raised above hinge 28 so as to provide an intermediate passage 22 between cover 12 and base 11. Therefore, even in the case wherein the terminal is in its fully opened position there is a means for air flow to pass between base 11 and cover 12 to provide cooling flow for the electronic circuits components contained therein. FIG. 4B shows cover 12 in a partially opened position with respect to base 11, and further illustrates the function of flexible membrane 25 in providing an air flow passage between base 11 and cover 12.

FIG. 5 is a top view of the apparatus showing the air flow directions throughout the carrying case 10. A fan 45 draws air into base 11 via inlet holes 18 as illustrated by the arrows. Fan 45 then forces this air in a rightward direction across the respective circuit boards hereinbefore described, and exhausts the air through exit holes 21. A portion of the air provided by fan 45 is deflected upward through passage 22 into the region behind display screen 20 in cover 12. This air flow deflects internally and ultimately exists through the respective holes in the vertical end surfaces of cover 12. It is therefore seen that a single fan 45 is able to provide cooling air flow over all circuit boards and electronic components, regardless of whether such components are contained in base 11 or in cover 12.

In operation, the apparatus is transported in the closed position by means of handle 17. When it is desired to use the terminal an electrical cord (not shown) is plugged between the terminal and a 110-volt AC outlet. A second wire connection (not shown) is connected between a suitable transmitting and receiving device, such as a telephone acoustic coupler, and a receptacle in ) carrying case 10 adapted for this purpose. As soon as the AC power is activated the internal fan begins operating and blows cooling air through the carrying case. If the cover remains closed this cooling air passes lengthwise across the device, drawing air into inlets 18 and exhausting the air through outlets 21. Cooling air is fed into cover 12 through the air channels hereinbefore described, to maintain all internal electrical components within design operating temperatures. If the terminal is to be operated as a desk top unit cover 12 is partially opened to the position shown in FIG. 1 and FIG. 4B. In this position the fan provides cooling air flow to electrical components as described herein. If the terminal is to be operated as a flat unit as show in FIG. 4A, as for example by mounting it against a wall surface, the keyboard and display elements function normally, and the cooling air flow continues to properly circulate air throughout the cover 12 and base 11.

Therefore, regardless of operating position, whenever power is applied the internal fan is able to satisfactorily maintain operating temperatures of the electrical circuit components within a tolerable design range. The circuit components in base 11 typically dissipate 15 watts of power and the circuit components in cover 12 typically dissipate 12 watts of power. In the preferred embodiment fan 45 delivers approximately 25 cubic feet per minute (cfm) of air movement, and 80-90% of this air is passed through base 11 for cooling the components internal to base 11. The remaining air flow is directed upward to cover 12 for cooling the components in cover 12. The lesser air flow required for cover 12 is caused by the fact that lower power is dissipated in cover 12 and also by the fact that a considerable amount of this power is dissipated by the glass screen 20 which extends entirely across the internal surface of cover 12.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. A portable electronic keyboard and display terminal for self-contained housing of a visual display panel and alphanumeric keyboard, comprising:
   a. a hinged case having a bottom portion and an openable cover, said bottom portion housing said keyboard and said cover housing said display panel;
   b. a plurality of spaced apart circuit boards beneath said keyboard, said circuit boards having air flow paths therebetween and having a common air flow communication zone adjacent said cover hinge side of said case;
   c. an air blower adjacent one end of said spaced apart circuit boards;
   d. at least one spaced apart circuit board inside said cover relative to said visual display panel, forming an air flow channel therebetween; and
   e. a flexible membrane having one end attached to said cover and another end attached to said bottom portion, said membrane extending along the hinged edge of said case to form an air flow communication path between said common air flow communication zone and said cover air flow channel.

2. The apparatus of claim 1, further comprising air holes in said bottom portion of said case adjacent said air blower.

3. The apparatus of claim 2, further comprising air holes in said cover in flow communication with said cover air flow channel.

4. The apparatus of claim 3, wherein said hinged case includes a piano hinge extending along substantially the entire length of said case.

5. A keyboard and display terminal for portable connection to telephone line communications systems, comprising:

a. a carrying case having a base storage volume and a cover storage volume and wherein said cover is hinged to said base along an edge;
b. a plurality of electronic circuit boards mounted in spaced apart attachment in said base storage volume, and including a keyboard as a topmost circuit board, all of said circuit boards spaced away from contact with the base edge having the cover hinge attachment;
c. at least one circuit board and a display screen mounted in spaced apart attachment in said cover storage volume, said display screen being spaced away from contact with the cover edge having the base hinge attachment; and
d. a flexible membrane extending the length of said cover and base edge hinge and having a side attached to said display screen and an opposite side attached to said keyboard.

6. The apparatus of claim 5, further comprising an air blower mounted in said base storage volume adjacent an end of said plurality of electronic circuit boards mounted in spaced apart attachment.

7. The apparatus of claim 6, further comprising ventilator openings in said base in the air flow coupling with said air blower.

8. The apparatus of claim 7, further comprising ventilator openings in said cover along edges perpendicular to the cover edge hinged to said base.

9. The apparatus of claim 8, further comprising ventilator openings in said base at a point opposite said air blower mounting.

10. The apparatus of claim 9, wherein said cover and base hinge further comprises a piano hinge.

* * * * *